US009935451B2

(12) United States Patent
Ikeuchi et al.

(10) Patent No.: US 9,935,451 B2
(45) Date of Patent: Apr. 3, 2018

(54) PROTECTION MONITORING CIRCUIT, BATTERY PACK, SECONDARY BATTERY MONITORING CIRCUIT, AND PROTECTION CIRCUIT

(71) Applicants: Akira Ikeuchi, Tokyo (JP); Yoshihide Majima, Tokyo (JP)

(72) Inventors: Akira Ikeuchi, Tokyo (JP); Yoshihide Majima, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 142 days.

(21) Appl. No.: 14/950,056

(22) Filed: Nov. 24, 2015

(65) Prior Publication Data

US 2016/0079746 A1 Mar. 17, 2016

Related U.S. Application Data

(63) Continuation of application No. 13/143,844, filed as application No. PCT/JP2010/050357 on Jan. 14, 2010, now Pat. No. 9,231,283.

(30) Foreign Application Priority Data

Jan. 14, 2009 (JP) ................................ 2009-006158
Jan. 14, 2010 (JP) ................................ 2010-005981

(51) Int. Cl.
*H02H 3/08* (2006.01)
*H02H 3/087* (2006.01)
(Continued)

(52) U.S. Cl.
CPC .............. *H02H 3/00* (2013.01); *H01M 10/44* (2013.01); *H01M 10/48* (2013.01);
(Continued)

(58) Field of Classification Search
CPC H02H 3/08; H02H 7/30; H02H 7/261; H02H 9/02; H02H 3/087
(Continued)

(56) References Cited

U.S. PATENT DOCUMENTS 6,060,185 A 5/2000 Okutoh
6,208,117 B1 3/2001 Hibi
(Continued)

FOREIGN PATENT DOCUMENTS

JP H11-283677 10/1999
JP 2000-209788 7/2000
(Continued)

OTHER PUBLICATIONS

International Search Report dated Mar. 30, 2010.

*Primary Examiner* — Dharti Patel
(74) *Attorney, Agent, or Firm* — IPUSA, PLLC

(57) ABSTRACT

A protection monitoring circuit includes a protection circuit which detects overcharge, overdischarge, and overcurrent of a secondary battery, and a secondary battery monitoring circuit which monitors a state of the secondary battery and detects a residual quantity of the secondary battery. The protection circuit includes a first communication terminal that is connected to the secondary battery monitoring circuit, a second communication terminal that is connected to a mobile device, and a level shift circuit that is connected to the first and second communication terminals. The level shift circuit performs a level shift of a signal input of the first communication terminal so as to become a second level and outputs the signal to the second communication terminal, and also performs the level shift of a signal input of the second communication terminal so as to become a first level and outputs the signal to the first communication terminal.

5 Claims, 7 Drawing Sheets

(51) Int. Cl.

| | |
|---|---|
| ***H02H 3/10*** | (2006.01) |
| ***H02H 3/00*** | (2006.01) |
| ***H01M 10/44*** | (2006.01) |
| ***H01M 10/48*** | (2006.01) |
| *H01M 10/0525* | (2010.01) |
| *H01M 10/42* | (2006.01) |
| *H02J 7/00* | (2006.01) |

(52) U.S. Cl.
CPC .................... *H01M 10/0525* (2013.01); *H01M 2010/4271* (2013.01); *H01M 2220/30* (2013.01); *H02J 2007/004* (2013.01); *H02J 2007/0037* (2013.01); *H02J 2007/0039* (2013.01)

(58) Field of Classification Search
USPC .................................................... 361/63, 93.1
See application file for complete search history.

(56) References Cited

U.S. PATENT DOCUMENTS

| | | | | |
|---|---|---|---|---|
| 6,291,965 | B1 | 9/2001 | Nagai et al. | |
| 2005/0024905 | A1 | 2/2005 | Shiojima | |
| 2008/0218127 | A1 | 9/2008 | Kao et al. | |
| 2009/0153103 | A1* | 6/2009 | Ikeuchi | H02J 7/0091 320/152 |

FOREIGN PATENT DOCUMENTS

| | | |
|---|---|---|
| JP | 2001-238358 | 8/2001 |
| JP | 2006-246652 | 9/2006 |
| JP | 2008-220149 | 9/2008 |

* cited by examiner

FIG.6

| DCNT | CCNT | COMMAND |
|---|---|---|
| 0 | 0 | COMPULSIVE FET CONTROL CANCELLATION |
| 0 | 1 | COMPULSIVE "DOUT" TERMINAL LEVEL SHIFT (H→L) |
| 1 | 0 | COMPULSIVE "COUT" TERMINAL LEVEL SHIFT (H→L) |
| 1 | 1 | INQUIRY OF PROTECTING DETECTION STATE |

FIG.7

| DCNT | CCNT | COMMAND |
|---|---|---|
| 0 | 0 | NO ERROR |
| 0 | 1 | DISCHARGE OVERCURRENT DETECTION |
| 1 | 0 | CHARGE OVERCURRENT DETECTION |
| 1 | 1 | OVERCHARGE DETECTION |

| DCNT | CCNT | COMMAND |
|---|---|---|
| 0 | 0 | OVERDISCHARGE DETECTION |
| 0 | 1 | DISCHARGE OVERCURRENT DETECTION |
| 1 | 0 | CHARGE OVERCURRENT DETECTION |
| 1 | 1 | OVERCHARGE DETECTION |

PROTECTION MONITORING CIRCUIT, BATTERY PACK, SECONDARY BATTERY MONITORING CIRCUIT, AND PROTECTION CIRCUIT

CROSS-REFERENCE TO RELATED APPLICATION

This application is a continuation patent application of, and claims the benefit of and priority to U.S. patent application Ser. No. 13/143,844 filed on Jul. 8, 2011, which is a National Phase application under 35 U.S.C. 371 of PCT/JP2010/050357 filed on Jan. 14, 2010, which is based on and claims the benefit of priority of Japanese Patent Application No. 2009-006158, filed on Jan. 14, 2009, and Japanese Patent Application No. 2010-005981, filed on Jan. 14, 2010, with the Japanese Patent Office, all of which are hereby incorporated by reference.

TECHNICAL FIELD

The present disclosure relates to a protection monitoring circuit, a battery pack, a secondary battery monitoring circuit, and a protection circuit.

BACKGROUND ART

In recent years, lithium ion batteries are installed in mobile devices, such as a digital camera and a cellular phone, as a secondary battery. Generally, lithium ion batteries are prone to overcharge, overdischarge and overcurrent, and a lithium ion battery is arranged in a form of a battery pack containing a protection circuit which detects overcharge, overcurrent and overdischarge of the battery to protect the battery from being damaged.

In a battery pack, a secondary battery monitoring circuit may be contained. This secondary battery monitoring circuit includes a temperature sensor which is arranged to detect a voltage change, corresponding to a temperature change in the battery pack, to determine a state of a lithium ion battery, such as a battery residual quantity. In this case, an additional communication terminal for transmitting an output signal from the secondary battery monitoring circuit to a mobile device is disposed in the battery pack, and the secondary battery monitoring circuit receives the signal indicating the state of the battery pack output from this communication terminal, and manages the operating state of the battery pack.

Conventionally, a charging device which receives a control signal for controlling charging of a battery pack from a communication terminal disposed in the battery pack is known. For example, refer to Patent Document 1 listed below.

Patent Document 1: Japanese Laid-Open Patent Publication No. 2000-209788

DISCLOSURE OF THE INVENTION

Problem to be Solved by the Invention

However, each of a protection circuit and a secondary battery monitoring circuit, disposed in a battery pack according to the related art, does not include a communication part for communicating with each other, each of these circuits may operate independently, and the secondary battery monitoring circuit does not include a unit for detecting performance of a protecting operation of the protection circuit.

Therefore, in order to determine whether the protection circuit is operated, the secondary battery monitoring circuit has to monitor the output of a voltage sensor and the output of a current sensor disposed in the secondary battery monitoring circuit.

In order to determine whether the result of the monitoring meets the state of the protection circuit for allowing the protecting operation, it is necessary for the secondary battery monitoring circuit to continuously perform the computations.

On the other hand, when determining performance of a protecting operation by the protection circuit based on the computations of the secondary battery monitoring circuit, there are the following problems. Performance of overcharge protecting operation by the protection circuit can be properly determined by monitoring the power supply voltage. However, performance of overdischarge protecting operation by the protection circuit is usually determined by detection of a power-on reset operation. Specifically, at a voltage in a vicinity of overdischarge detection voltage, supply of the power supply voltage to the secondary battery monitoring circuit is inhibited, and it is necessary to detect whether the supply of the power supply voltage to the secondary battery monitoring circuit is restarted. In this case, there is a possibility of erroneous detection, and it is difficult to accurately determine whether the protection circuit has been operated.

Also with respect to performance of an overcurrent protecting operation and performance of a short circuit protecting operation, it is very difficult to determine whether the protection circuit has been operated. The value of an overcurrent detection current of the protection circuit is out of the range of the current that can be measured by the secondary battery monitoring circuit, and the delay time up to the overcurrent detection of the protection circuit is very short. The protection circuit may operate before the secondary battery monitoring circuit completes the current measurement, and it is difficult to measure the current value.

Therefore, in order to store an accurate operating state of the protection circuit into the secondary battery monitoring circuit, it is necessary to provide a certain notification mechanism.

Furthermore, it is also necessary to provide a duplicate protection function for increased safety by compulsively operating the protection circuit by the secondary battery monitoring circuit based on information of the overcharge or the overcurrent of the secondary battery detected by the secondary battery monitoring circuit.

Accordingly, in one aspect, the present disclosure a protection monitoring circuit, a battery pack, a secondary battery monitoring circuit, and a protection circuit, which are adapted to allow the secondary battery monitoring circuit to operate a protecting function of the protection circuit, allow the secondary battery monitoring circuit to request receiving of an operating state of the protection circuit from the protection circuit, and allow the protection circuit to send an operating state of the protection circuit to the secondary battery monitoring circuit.

Means to Solve the Problem

In an embodiment which solves or reduces one or more of the above-described problems, the present disclosure provides a protection monitoring circuit (101) including: a secondary battery monitoring circuit (120) which detects a state of a chargeable and dischargeable secondary battery (110); and a protection circuit (130) which performs an ON/OFF control of a charge control transistor or a discharge control transistor (M11, M12) disposed between the secondary battery (110) and a load or a charger device, and protects the secondary battery (110), wherein the secondary battery monitoring circuit (120) outputs a control signal that compulsively turns on/off the charge control transistor or the discharge control transistor (M11, M12), to the protection circuit (130), and the protection circuit (130) performs the ON/OFF control of the charge control transistor or the discharge control transistor upon receipt of the control signal.

The protection monitoring circuit (101) of the present disclosure may be arranged so that the the secondary battery monitoring circuit (120) detects at least one of overcharge, overdischarge, and overcurrent of the secondary battery (110), and when the at least one of overcharge, overdischarge, and overcurrent of the secondary battery (110) is detected, the secondary battery monitoring circuit outputs a control signal that compulsively turns off the charge control transistor or the discharge control transistor, to the protection circuit (130), and the protection circuit (130) performs an OFF control of the charge control transistor or the discharge control transistor upon receipt of the compulsive turn-off control signal.

The protection monitoring circuit (101) of the present disclosure may be arranged so that respective thresholds that are predetermined for the protection circuit (130) to detect overcharge, overdischarge, and overcurrent of the secondary battery (110) are different from respective thresholds that are predetermined for the secondary battery monitoring circuit (120) to detect overcharge, overdischarge, and overcurrent of the secondary battery (110).

The protection monitoring circuit (101) of the present disclosure may be arranged so that the secondary battery monitoring circuit (120) outputs an operating state inquiry signal that requests receiving of an operating state of the protection circuit (130), to the protection circuit (130), and, when the inquiry signal is received, the protection circuit (130) outputs a notification signal that indicates the operating state of the protection circuit, to the secondary battery monitoring circuit (120).

The protection monitoring circuit (101) of the present disclosure may be arranged so that, when at least one of overcharge, overdischarge, and overcurrent of the secondary battery (110) is detected, the protection circuit (130) outputs a notification signal that indicates the detection, to the secondary battery monitoring circuit (120), and the secondary battery monitoring circuit (120) includes a nonvolatile memory (124), and stores information that indicates the detection or the operating state, in the nonvolatile memory (124) when the notification signal or the operating state notification signal is received.

The protection monitoring circuit (101) of the present disclosure may be arranged so that the secondary battery monitoring circuit (120) counts the number of times of detection for each of overcharge, overdischarge, and overcurrent of the secondary battery (110) in response to the notification signal or the operating state notification signal received, and stores the counted number of times of detection for each of overcharge, overdischarge, and overcurrent of the secondary battery in the nonvolatile memory (124).

The protection monitoring circuit (101) of the present disclosure may be arranged so that, when one of the counted numbers of times of detection exceeds a corresponding one of predetermined numbers of times for each of overcharge, overdischarge, and overcurrent of the secondary battery (110), the secondary battery monitoring circuit (120) outputs a control signal that compulsively turns off the charge control transistor or the discharge control transistor, to the protection circuit (130) based on a result of the detection.

The protection monitoring circuit (101) of the present disclosure may be arranged so that the protection circuit (130) includes a first communication terminal (152) connected to the secondary battery monitoring circuit (120), a second communication terminal (153) connected to a communication terminal (116) coupled to the load, and a circuit which connects the first communication terminal (152) and the second communication terminal (153) together, and the circuit is arranged to pass through a signal transmitted between the secondary battery monitoring circuit (120) and the load.

The protection monitoring circuit (101) of the present disclosure may be arranged to further include a resistor (R4) which is connected between the communication terminal (116) coupled to the load and the second communication terminal (153).

Furthermore, the present disclosure provides a battery pack (100) in which the above-described protection monitoring circuit (101) is arranged.

In an embodiment which solves or reduces one or more of the above-described problems, the present disclosure provides a secondary battery monitoring circuit (120) which detects a state of a chargeable and dischargeable secondary battery (110) and is connected to a protection circuit (130) which detects at least one of overcharge, overdischarge, and overcurrent of the secondary battery (110) and performs an ON/OFF control of a charge control transistor or a discharge control transistor disposed between the secondary battery and a load or a charger device, to protect the secondary battery, wherein the secondary battery monitoring circuit (120) is arranged to output a control signal that compulsively turns on/off the charge control transistor or the discharge control transistor, to the protection circuit (130).

The secondary battery monitoring circuit (120) of the present disclosure may be arranged so that the secondary battery monitoring circuit outputs a control signal that compulsively turns off the charge control transistor or the discharge control transistor, to the protection circuit (130) when at least one of overcharge, overdischarge, and overcurrent of the secondary battery (110) is detected.

The secondary battery monitoring circuit (120) of the present disclosure may be arranged so that the secondary battery monitoring circuit includes a nonvolatile memory (124), and when an operating state notification signal indicating an operating state of the protection circuit (30) is received from the protection circuit (130), or when a notification signal indicating that at least one of overcharge, overdischarge, and overcurrent of the secondary battery (110) is detected is received from the protection circuit (130), the secondary battery monitoring circuit stores information that indicates the detection by the protection circuit or the operating state of the protection circuit, in the nonvolatile memory (124).

The secondary battery monitoring circuit (120) of the present disclosure may be arranged so that the secondary battery monitoring circuit counts the number of times of detection for each of overcharge, overdischarge, and overcurrent of the secondary battery (110) in response to the notification signal or the operating state notification signal received, and stores the counted number of times of detection for each of overcharge, overdischarge, and overcurrent of the secondary battery in the nonvolatile memory (124), and, when one of the counted numbers of times of detection exceeds a corresponding one of predetermined numbers of times for each of overcharge, overdischarge, and overcurrent of the secondary battery, the secondary battery monitoring circuit outputs a control signal that compulsively turns off the charge control transistor or the discharge control transistor, to the protection circuit (130) based on a result of the detection.

In an embodiment which solves or reduces one or more of the above-described problems, the present disclosure provides a protection circuit (130) which is connected to a secondary battery monitoring circuit (120), which detects a state of a chargeable and dischargeable secondary battery (110) and has a nonvolatile memory (124) which stores a control state by the protection circuit, wherein the protection circuit (130) detects at least one of overcharge, overdischarge, and overcurrent of the secondary battery (110) and performs an ON/OFF control of a charge control transistor or a discharge control transistor disposed between the secondary battery (110) and a load or a charger device to protect the secondary battery (110), and wherein the protection circuit performs the ON/OFF control of the charge control transistor or the discharge control transistor when a control signal that compulsively turns on/off the charge control transistor or the discharge control transistor is received from the secondary battery monitoring circuit (120).

The protection circuit (130) of the present disclosure may be arranged to output a notification signal indicating that the at least one of overcharge, overdischarge, and overcurrent of the secondary battery (110) is detected, to the secondary battery monitoring circuit (120).

It is to be understood that the reference numerals in parentheses in the foregoing general description are exemplary and explanatory and not restrictive of the present disclosure.

Effect of the Invention

According to the present disclosure, the secondary battery monitoring circuit can operate a protecting function of the protection circuit, the secondary battery monitoring circuit can request receiving of an operating state of the protection circuit from the protection circuit, and the protection circuit can send an operating state of the protection circuit to the secondary battery monitoring circuit.

BRIEF DESCRIPTION OF THE DRAWINGS

FIG. 6 is a diagram showing a list of commands recognized by the protection IC.

FIG. 7 is a diagram showing a notification command of a protecting detection state of the protection IC sent to the secondary battery monitoring IC.

BEST MODE FOR CARRYING OUT THE INVENTION

A description will be given of embodiments of the present disclosure with reference to the accompanying drawings.

<Internal Composition of Battery Pack>

Figure 1:
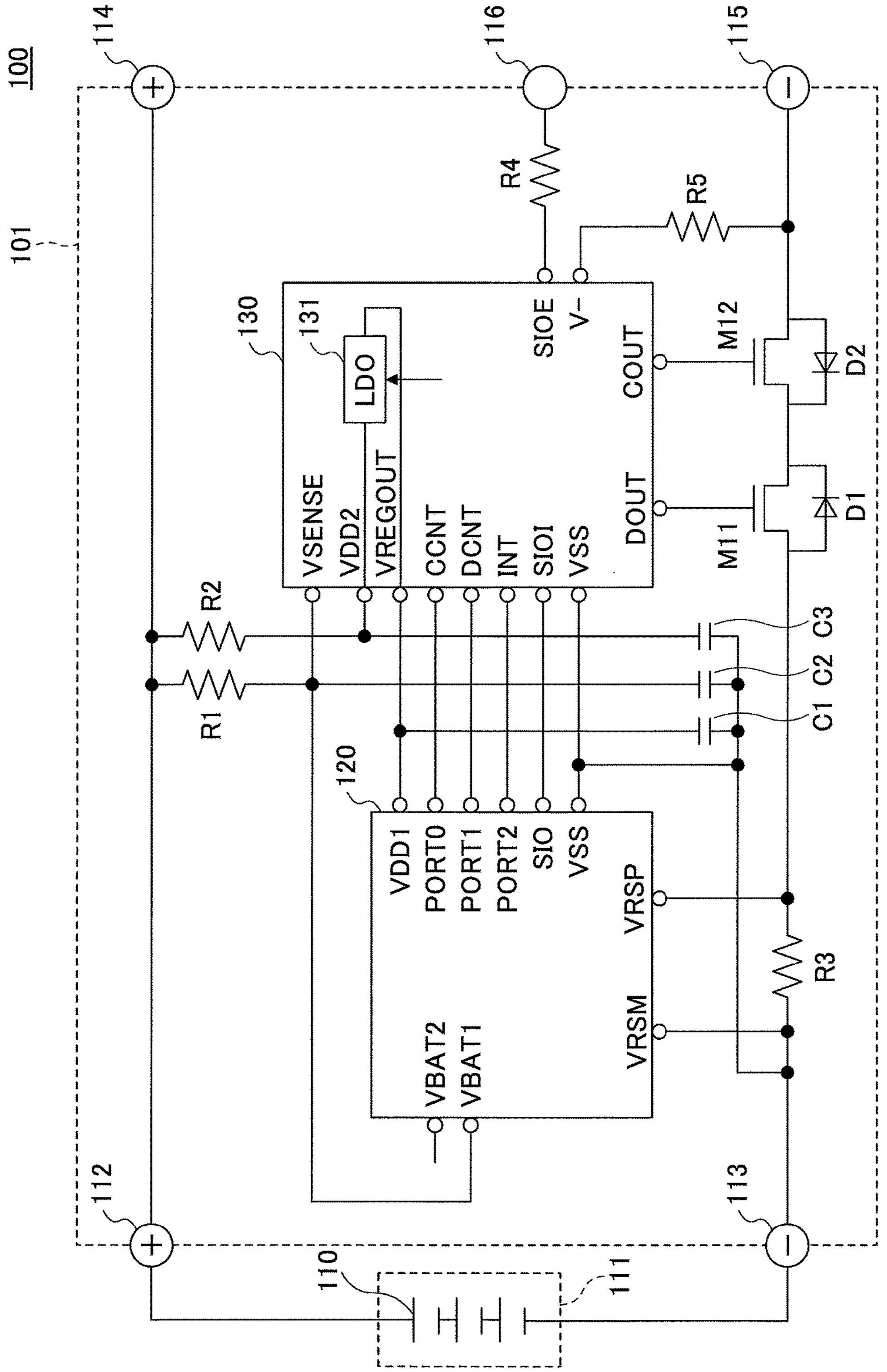
FIG. 1 is a diagram showing the composition of a battery pack of an embodiment of the present disclosure.

FIG. 1 is a diagram showing the composition of a battery pack of an embodiment of the present disclosure.

As shown in FIG. 1, the battery pack 100 is constructed to include a protection monitoring circuit 101 and a battery unit 111. The protection monitoring circuit 101 and the battery unit 111 are connected together by a secondary battery positive terminal 112 and a secondary battery negative terminal 113.

The protection monitoring circuit 101 includes a secondary battery monitoring IC 120, a protection IC 130, resistors R1-R5, capacitors C1-C3, a MOS (metal oxide semiconductor) transistor M11 having a parasitism diode D1, a MOS transistor M12 having a parasitism diode D2, a positive terminal 114, a negative terminal 115, and an external terminal 116 which are disposed on a single substrate and constructed into a protection module or a COB (chip on board) module. The secondary battery monitoring circuit and the protection circuit may be constructed by an IC (integrated circuit), or may be provided in the form of, for example, an IC package or a COB module.

The battery pack 100 is connected to a mobile device, a charging device, etc. by the positive terminal 114 and the negative terminal 115. The battery pack 100 monitors a state of a battery unit 111 which includes two or more secondary batteries 110, by using the secondary battery monitoring IC 120, and protects the battery unit 111 from overcharge, overcurrent, overdischarge, etc. by using the protection IC 130.

<Secondary Battery Monitoring IC 120>

Next, the secondary battery monitoring IC 120 shown in FIG. 1 will be described.

The secondary battery monitoring IC 120 monitors a state of the battery unit 111, acquires the state information of the battery unit 111, and detects a residual quantity of the battery and other information. The secondary battery monitoring IC 120 sends the acquired state information to the mobile device when a request for accessing the state information is received from the mobile device. For example, the product name MM8002 is attached to the secondary battery monitoring IC 120.

The secondary battery monitoring IC 120 is constructed to include a VDD1 terminal which is a power-supply terminal, a VSS terminal which is a reference potential terminal, a VBAT1 terminal which is a voltage detection terminal of the battery unit 111, a VRSP terminal and a VRSM terminal which are a set of voltage detection terminals to detect a voltage between the ends of a resistor R3, an SIO terminal which is a communication terminal with the mobile device, a PORT0 terminal which is a communication terminal with the protection IC 130, a PORT1 terminal, and a PORT2 terminal.

The power supply voltage from the protection IC 130 is regulated (stabilized) and the regulated power supply voltage is supplied to the secondary battery monitoring IC 120 via the VDD1 terminal which is the power-supply terminal. The value of the power supply voltage supplied from the protection IC 130 is set to a voltage value which is lower than a predetermined value of the power supply voltage of the battery unit 111 which is detected as overdischarge of the battery. The secondary battery monitoring IC 120 is controlled to operate appropriately under the value of the power supply voltage which is set up in this way.

The secondary battery monitoring IC 120 detects a power supply voltage of the battery unit 111 through the VBAT1 terminal which is the voltage detection terminal connected to the position terminal of the battery unit 111. The VRSM and VRSP terminals which are the set of voltage detection terminals are to detect the voltage between the ends of the resistor R3 which is disposed outside the secondary battery monitoring IC 120, and thereby detect the current flowing through the resistor R3. Hence, the secondary battery monitoring IC 120 detects the charging/discharge current of the battery unit 111.

The SIO terminal of the secondary battery monitoring IC 120 is connected through the protection IC 130 to the external terminal 116 which is used for communication with the mobile device. The secondary battery monitoring IC 120 performs communication with the mobile device through the SIO terminal (which is the communication terminal) and the protection IC 130.

The secondary battery monitoring IC 120 performs communication with the protection IC 130 through the PORT0 terminal, the PORT1 terminal, and the PORT2 terminal, which are the communication terminals connected to the protection IC 130.

For example, the secondary battery monitoring IC 120 outputs, to the protection IC via the PORT0 terminal, the PORT1 terminal and the PORT2 terminal, a control signal for compulsively turning off or compulsively turning on the MOS transistors M11 and M12 which are the discharge control transistor and the charge control transistor of the protection IC 130.

Specifically, when it is detected that the battery voltage of the battery unit 111 is higher than a predetermined overcharge detection voltage value, a charge control signal for compulsively turning off the MOS transistor M12 (the charge control transistor) is output to the protection IC 130. When it is detected that the battery voltage of the battery unit 111 is lower than a predetermined overdischarge detection voltage value, the secondary battery monitoring IC 120 outputs a discharge control signal for compulsively turning off the MOS transistor M11 (the discharge control transistor), to the protection IC 130.

When it is detected that the charging current of the battery unit 111 is higher than a predetermined charge overcurrent detection current value, the secondary battery monitoring IC 120 outputs a charge control signal for compulsively turning off the MOS transistor M12 (the charge control transistor) to the protection IC 130. When it is detected that the discharge current of the battery unit 111 is lower than a predetermined discharge overcurrent value, the secondary battery monitoring IC 120 outputs a discharge control signal for compulsively turning off the MOS transistor M11 (the discharge control transistor) to the protection IC 130.

The secondary battery monitoring IC 120 outputs an operating state inquiry signal that requests receiving of an operating state of the protection IC 130, to the protection IC 130, and receives from the protection IC 130 a notification signal that indicates the operating state of the protection IC 130 in response to the inquiry signal. The secondary battery monitoring IC 120 receives from the protection IC 130 a notification signal indicating that any of overcharge, overdischarge, charge overcurrent and discharge overcurrent of the secondary battery has been detected.

The secondary battery monitoring IC 120 stores the information indicating the operating state of the protection IC 130 in the nonvolatile memory based on the operating state notification signal received from the protection IC 130, or stores in the nonvolatile memory the information indicating the detection of any of overcharge, overdischarge, charge overcurrent and discharge overcurrent of the secondary battery, based on the notification signal received from the protection IC 130.

<Protection IC 130>

Next, the protection IC 130 shown in FIG. 1 will be described. The protection IC 130 includes an overcharge detection circuit, an overcurrent detection circuit, and an overdischarge detection circuit which are built in the protection IC 130, and detects overcharge, overcurrent, and overdischarge of the battery unit 111, to protect the battery unit 111 from overcharge, overcurrent, and overdischarge. For example, the product name MM3289 is attached to the protection IC 130.

The protection IC 130 is constructed to include a VDD2 terminal which is a power-supply terminal, a VSS terminal which is a reference potential terminal, a VSENSE terminal which is a voltage detection terminal, and a VREGOUT terminal which is a terminal which outputs the regulated voltage to the secondary battery monitoring IC 120.

The protection IC 130 is constructed to include a DOUT terminal, a COUT terminal, a CCNT terminal, a DCNT terminal, and an INT terminal. The DOUT and COUNT terminals are respectively connected to the gates of the MOS transistors M11 and M12 which are used to inhibit the charging and discharging of the battery pack 100. The CCNT, DCNT and INT terminals are communication terminals with the secondary battery monitoring IC 120.

The power supply voltage is supplied to the protection IC 130 through the VDD2 terminal which is the power-supply terminal connected to the position terminal of the battery unit 111. The VSS terminal which is the reference potential terminal is connected to the negative electrode of the battery unit 111.

The protection IC 130 includes a voltage regulator (LDO) 131 which performs a low saturation regulation. The power supply voltage supplied to the VDD2 terminal is regulated by the voltage regulator 131, and the regulated power supply voltage is supplied to the secondary battery monitoring IC 120 via the VREGOUT terminal. The value of the power supply voltage (the output voltage of the voltage regulator 131) which is regulated by the voltage regulator 131 and supplied to the secondary battery monitoring IC 120 is set up to be lower than a predetermined value of the power supply voltage of the battery unit 111 that is detected as overdischarge. The secondary battery monitoring IC 120 is controlled to operate appropriately under the value of the power supply voltage which is set up in this way.

When the value of the power supply voltage of the battery unit 111 is lowered, such as in a case where overdischarge of the battery unit 111 is detected, the value of the power supply voltage supplied to the secondary battery monitoring IC 120 is also lowered. Hence, if the value of the power supply voltage for the secondary battery monitoring IC 120 to operate normally is set up to be higher than the predetermined value of the power supply voltage and overdischarge of the battery unit 111 is detected, then the power supply voltage for the secondary battery monitoring IC 120 to operate normally is not supplied. In this case, the operating state of the secondary battery monitoring IC 120 may be unstable. Although the secondary battery monitoring IC 120 has the function of monitoring the state of the power supply voltage of the battery unit 111, the state of the battery unit 111 cannot be accurately detected by the secondary battery monitoring IC 120 which is in the unstable operating state.

However, in this embodiment, the value of the regulated power supply voltage being supplied to the secondary battery monitoring IC 120 is set up to be lower than the predetermined value of the power supply voltage of the battery unit 111 that is detected as overdischarge. Hence, the secondary battery monitoring IC 120 is controlled to operate appropriately.

When the value of the regulated power supply voltage being supplied to the secondary battery monitoring IC 120 is lowered due to lowering of the power supply voltage of the battery unit 111, overdischarge of the battery unit 111 is first detected, and the supply of the power supply voltage to the secondary battery monitoring IC 120 is inhibited as described above. Hence, even if the power supply voltage of the battery unit 111 is lowered to a value in the vicinity of the overdischarge detection voltage of the protection IC 130, it is possible to prevent the power supply voltage supplied to the secondary battery monitoring IC 120 from being lowered. Therefore, the secondary battery monitoring IC 120 can normally store the log information of the state of the battery unit 111 before overdischarge of the battery unit 111 is detected.

In this embodiment, the voltage regulator 131 and the protection IC 130 are arranged in a unitary composition and integrated on the substrate. The present disclosure is not limited to this embodiment. Alternatively, the voltage regulator 131 and the protection IC 130 may be arranged separately on different substrates.

The protection IC 130 detects a power supply voltage of the battery unit 111 through the VSENSE terminal which is the voltage detection terminal connected to the position terminal of the battery unit 111. The VSENSE terminal is used to detect overcharge of the battery unit 111 and to input a voltage to the overdischarge detection circuit. When overdischarge or overcurrent of the battery unit 111 is detected, the protection IC 130 turns off the MOS transistor M11 by setting the output of the DOUT terminal to a low level. When overcharge or charge overcurrent of the battery unit 111 is detected, the protection IC 130 turns off the MOS transistor M12 by setting the output of the COUT terminal to a low level.

The protection IC 130 performs communication with the secondary battery monitoring IC 120 through the CCNT terminal, the DCNT terminal and the INT terminal, which are the communication terminals connected to the secondary battery monitoring IC 120. Specifically, when one of overcharge, overcurrent, and overdischarge of the battery unit 111 is detected, the protection IC 130 outputs a notification signal indicating that the one of overcharge, overcurrent, and overdischarge of the battery unit 111 is detected, to the secondary battery monitoring IC 120.

When overdischarge of the battery unit 111 is detected, the protection IC 130 turns off the voltage regulator 131 (shutdown) after a predetermined time has elapsed from the time of detection of the battery overdischarge or after a control signal for turning off the voltage regulator 131 (or a voltage regulator OFF signal) is received from the secondary battery monitoring IC 120, and inhibits supply of the power supply voltage to the secondary battery monitoring IC 120. At the same time, the protection IC 130 is shifted to a shutdown mode.

After the protection IC 130 is shut down at the time of detection of the battery overdischarge, charging of the secondary battery 111 is restarted. When a predetermined voltage of the secondary battery 111 by the charging is reached, the protection IC 130 determines that the secondary battery 111 is returned to the normal state from the overdischarge state, and turns on the voltage regulator 131.

In the present embodiment, the respective predetermined thresholds for the protection IC 130 to detect overcharge, overdischarge, and overcurrent of the battery unit are different from the respective predetermined thresholds for the secondary battery monitoring IC 120 to detect overcharge, overdischarge, and overcurrent of the battery unit. Thereby, the protection monitoring circuit 101 can provide the double detection functions of the secondary battery monitoring IC 120 and the protection IC 130 for detecting overcharge and other states of the battery unit.

<Hardware Composition of Secondary Battery Monitoring IC 120>

Figure 2:
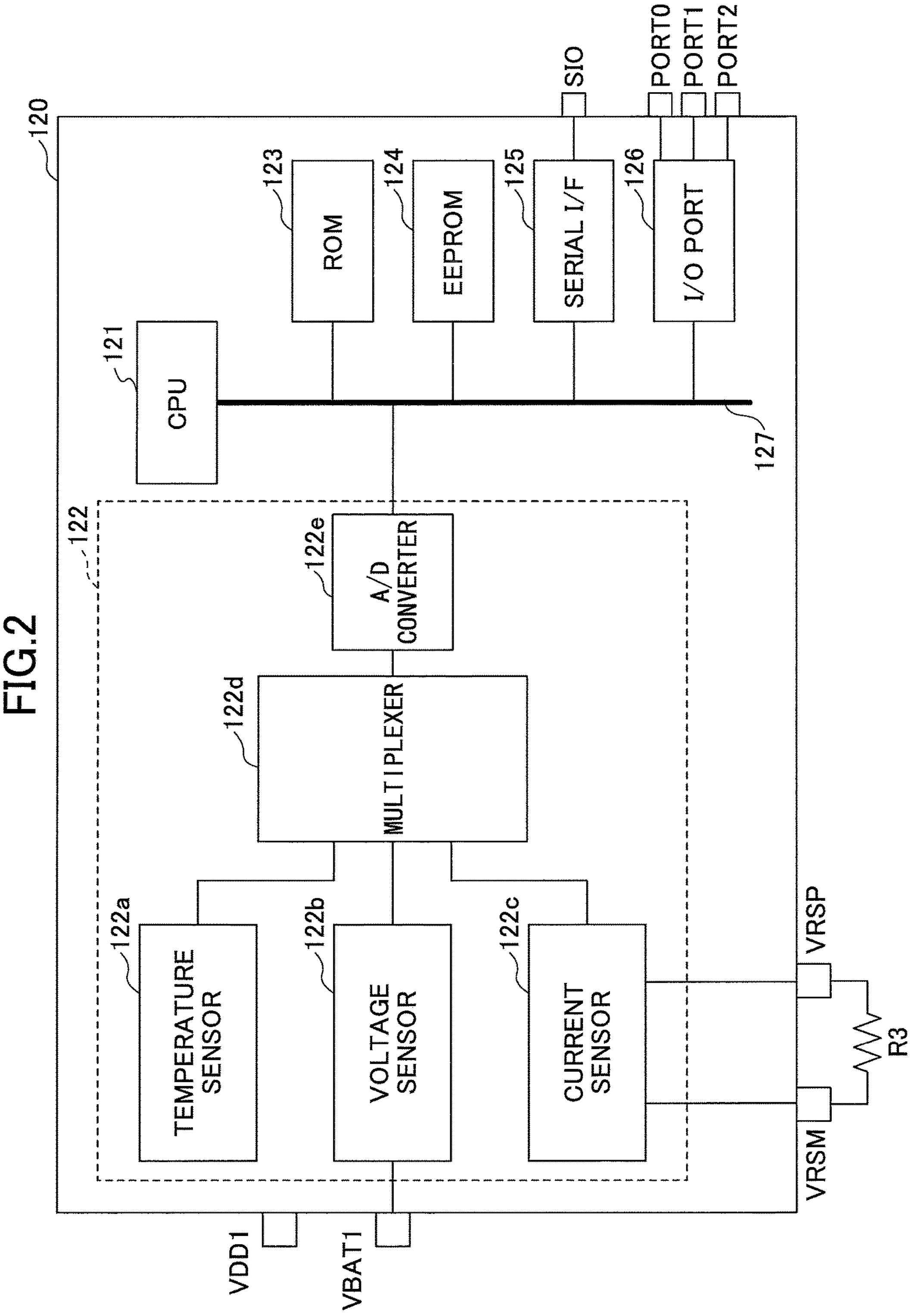
FIG. 2 is a diagram showing the hardware composition of a secondary battery monitoring IC.

Next, the secondary battery monitoring IC 120 will be described with reference to FIG. 2. FIG. 2 shows the hardware composition of the secondary battery monitoring IC 120 of this embodiment.

As shown in FIG. 2, the secondary battery monitoring IC 120 is constructed to include a CPU (central processing unit) 121, a sensor part 122, a ROM (read only memory) 123, an EEPROM (electronically erasable and programmable ROM) 124, a serial interface (I/F) 125, and an input/output port (I/O port) 126.

The CPU 121 controls respective parts of the secondary battery monitoring IC 120. The sensor part 122 detects a voltage, a current, and a temperature of the battery unit 111. The ROM 123 stores a program executed by the CPU 121 to control the respective parts of the secondary battery monitoring IC 120.

The CPU 121 generates a control signal sent to the protection IC 130, and outputs the generated control signal to the protection IC 130 via the input/output port 126 from PORT0, PORT1, and PORT2 terminals which are connected to the protection IC 130.

Specifically, when a notification signal indicating that the battery overdischarge is detected by the protection IC 130 is received from the PORT0, PORT1 and PORT2 terminals, the CPU 121 performs an interrupt process to store the information indicating that the overdischarge is detected by the protection IC 130 into the nonvolatile memory, such as the EEPROM 124 or the like.

At this time, the CPU 121 stores the information indicating that the overdischarge is detected. Immediately before stopping the operation (function) of the secondary battery monitoring IC 120, the CPU 121 generates a voltage regulator OFF signal which is a control signal for turning off the voltage regulator 131 of the protection IC 130, and outputs the generated signal to the protection IC 130 via the PORT0, PORT1 and PORT2 terminals.

For example, when the information indicating the detection of the battery overdischarge is stored in the EEPROM

124, the CPU 121 increments the number of times of detection by using a register, etc. to count the number of times of detection and stores the counted number of times of detection in the EEPROM 124.

The EEPROM 124 stores information including respective parameters of the voltage, the current and the temperature, etc. of the battery unit 111 detected by the sensor part 122. The EEPROM 124 further stores the information indicating that one of overcharge, overcurrent and overdischarge of the battery unit 111 is detected, which information is received via the input/output port 126 from the PORT0, PORT1 and PORT2 terminals which are the three communication terminals.

The input/output port 126 is used to send or receive the signal for communicating with the protection IC 130, through the PORT0, PORT1 and PORT2 terminals which are the three communication terminals.

The CPU 121, the sensor part 122, the ROM 123, the EEPROM 124, the serial I/F 125, and the input/output port 126 are interconnected by a bus 127 and data and programs can be exchanged between these components.

The sensor part 122 is constructed to include a temperature sensor circuit 122*a*, a voltage sensor circuit 122*b*, a current sensor circuit 122*c*, a multiplexer 122*d*, and an analog-to-digital (A/D) converter 122*e*.

The temperature sensor circuit 122*a* detects a temperature of the battery unit 111. The voltage sensor circuit 122*b* detects an output voltage of the battery unit 111 via a voltage detection terminal VBAT1 which is connected to the battery unit 111. The current sensor circuit 122*c* detects a current which flows through an external resistor R3, i.e., the charging and discharging current of the battery unit 111, via voltage detection terminals VRSP and VRSM which are connected to the ends of the external resistor R3.

The outputs of the temperature sensor circuit 122*a*, the voltage sensor circuit 122*b* and the current sensor circuit 122*c* are connected to the multiplexer 122*d*, and the multiplexer 122*d* outputs a single output signal. The A/D converter 122*e* converts the analog signal output from the multiplexer 122*d* into digital data.

<Outline of Internal Composition of Protection IC 130>

Figure 3:
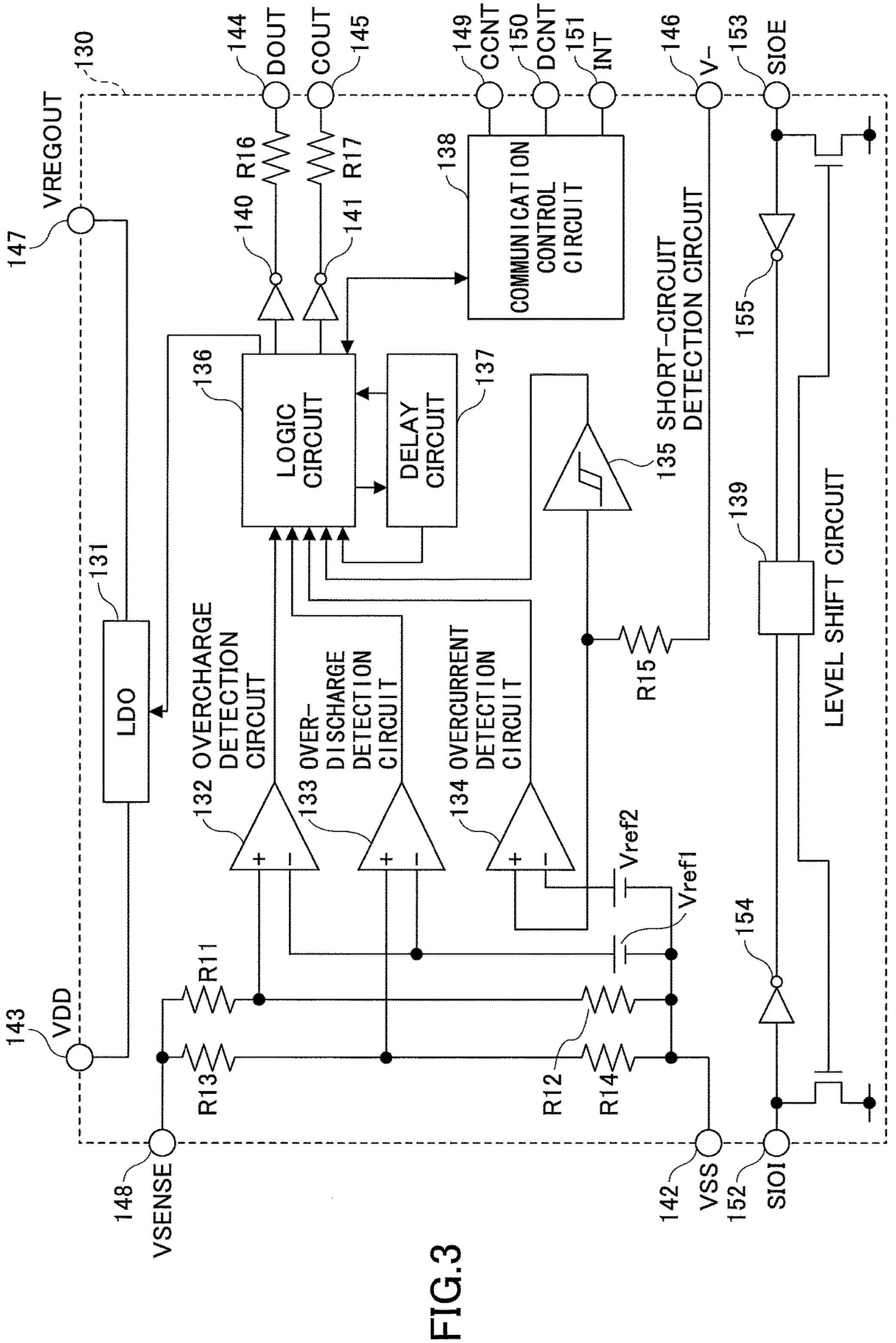
FIG. 3 is a diagram showing the internal composition of a protection IC.

Next, with reference to FIG. 3, the outline of the internal composition of the protection IC 130 will be described. FIG. 3 shows the outline of the internal composition of the protection IC.

As shown in FIG. 3, the protection IC 130 is constructed to include a voltage regulator (LDO) 131, an overcharge detection circuit 132, an overdischarge detection circuit 133, an overcurrent detection circuit 134, and a short-circuit detection circuit 135.

The protection IC 130 is constructed to include a logic circuit 136, a delay circuit 137, and a communication control circuit 138. The logic circuit 136 generates a control signal based on a detection signal received from each of the above detection circuits and outputs the control signal. The delay circuit 137 is a non-sensitive time setting circuit. The communication control circuit 138 controls the bidirectional communication between the protection IC 130 and the secondary battery monitoring IC 120.

As shown in FIG. 3, the protection IC 130 is constructed to include a VSS terminal 142, a VDD terminal 143, a DOUT terminal 144, a COUT terminal 145, a V−(minus) input terminal 146, a VREGOUT terminal 147, a VSENSE terminal 148, a CCNT terminal 149, a DCNT terminal 150, and an INT terminal 151.

The voltage regulator 131 is connected to the VDD terminal 143 (the VDD2 terminal shown in FIG. 1) which is a power-supply terminal, and carries out the regulation of the power supply voltage being supplied to the protection IC 130. The voltage regulator 131 is connected to the VREGOUT terminal 147, regulates the power supply voltage, and outputs the regulated power supply voltage from the VREGOUT terminal 147 to the secondary battery monitoring IC 120.

The overcharge detection circuit 132 includes a comparator. In the overcharge detection circuit 132, the non-inverted input terminal is connected to a junction point between the resistors R11 and R12 which are connected in series between the VSS terminal 142 and the VSENSE terminal 148, and the inverted input terminal is connected to the positive electrode side of a reference voltage source Vref1.

The overdischarge detection circuit 133 includes a comparator similar to the overcharge detection circuit 132. In the overdischarge detection circuit 133, the non-inverted input terminal is connected to a junction point between the resistors R13 and R14 which are connected in series between the VSS terminal 142 and the VSENSE terminal 148. The inverted input terminal of the overdischarge detection circuit 133 is connected to the positive electrode side of the reference voltage source Vref1.

The overcurrent detection circuit 134 includes a comparator similar to the overcharge detection circuit 132 or the overdischarge detection circuit 133. In the overcurrent detection circuit 134, the non-inverted input terminal is connected to the V− input terminal 146 via the resistor R15, and the inverted input terminal is connected to the positive electrode side of a reference voltage source Vref2. The negative electrode side of each of the reference voltage sources Vref1 and Vref2 is connected to the VSS terminal 142.

The short-circuit detection circuit 135 includes an amplifier with a hysteresis function, and is connected to the V− input terminal 146 via the resistor R15.

The overcharge detection circuit 132 outputs an overcharge detection signal when an overcharge state of the secondary battery is detected. The overdischarge detection circuit 133 outputs an overdischarge detection signal when an overdischarge state of the secondary battery is detected, and outputs an overdischarge return signal when an overdischarge recovery of the secondary battery is detected. The overcurrent detection circuit 134 outputs an overcurrent detection signal when an overcurrent of the secondary battery is detected.

Outputting any one of the overcharge detection signal, the overdischarge detection signal and the overcurrent detection signal is maintained while a corresponding one of the overcharge state, the overdischarge state and the overcurrent state of the secondary battery is continued, and each corresponding detection signal is input to the logic circuit 136. When the corresponding one of the overcharge detection signal, the overdischarge detection signal and the overcurrent detection signal is input to the logic circuit 136, the logic circuit 136 outputs a signal according to each corresponding state to the delay circuit 137.

The delay circuit 137 outputs a first overdischarge designation signal to the logic circuit 136 when the signal corresponding to the overdischarge detection signal is received from the logic circuit 136 and a first-step non-sensitive time which is predetermined for the overdischarge detection signal has elapsed. Further, the logic circuit 136 outputs a second overdischarge designation signal to the logic circuit 136 when a predetermined second-step non-sensitive time has elapsed.

The logic circuit 136 outputs a discharge control signal for cutting off the discharging current to the DOUT terminal 144 via the inverter 140 and the resistor R16 when the first overdischarge designation signal described above is received. Further, the logic circuit 136 outputs a voltage-regulator OFF signal for turning off the voltage regulator 131 to the voltage regulator 131 when the second overdischarge designation signal described above is received.

The delay circuit 137 outputs an overcurrent designation signal to the logic circuit 136 when the signal corresponding to the overcurrent detection signal is received from the logic circuit 136 and a non-sensitive time which is predetermined for the overcurrent detection signal has elapsed. When the overcurrent designation signal is received, the logic circuit 136 outputs a discharge control signal for cutting off the discharging current to the DOUT terminal 144.

The logic circuit 136 outputs a discharge control signal for cutting off the discharging current to the DOUT terminal 144, without non-sensitive time, when a short-circuit detection signal is received from the short-circuit detection circuit 135.

The logic circuit 136 outputs a voltage regulator ON signal for turning on the voltage regulator 131 to the voltage regulator 131, without non-sensitive time, when an overdischarge return signal is received from the overdischarge detection circuit 133.

The delay circuit 137 outputs an overcharge designation signal to the logic circuit 136 when the signal corresponding to the overcharge detection signal is received from the logic circuit 136 and a non-sensitive time which is predetermined for the overcharge detection signal has elapsed. When the overcharge designation signal is received, the logic circuit 136 outputs a charge control signal for cutting off the charging current to the COUT terminal 145 via the inverter 141 and the resistor R17.

When a voltage regulator OFF signal for turning off the voltage regulator 131 is received from the secondary battery monitoring IC 120 via one of the CCNT terminal 149, the DCNT terminal 150 and the INT terminal 151, the communication control circuit 138 outputs a notification signal indicating the shutdown of the voltage regulator 131 to the logic circuit 136. The logic circuit 136 outputs a voltage regulator OFF signal to the voltage regulator 131 in response to the notification signal indicating the shutdown of the voltage regulator 131 and received from the communication control circuit 138.

When a corresponding one of the overcharge detection signal, the overdischarge detection signal and the overcurrent detection signal is received at the logic circuit 136 as described above, the communication control circuit 138 outputs the corresponding one of the overcharge detection signal, the overdischarge detection signal and the overcurrent detection signal to the secondary battery monitoring IC 120 via a corresponding one of the CCNT terminal 149, the DCNT terminal 150 and the INT terminal 151.

The protection IC 130 is constructed to include an SIOI terminal 152 connected to the secondary battery monitoring IC 120, a level shift circuit 139 to perform the level shifting of the communication pulse signal output from the SIOI terminal 152, and an SIOE terminal 153 connected to the external terminal 116 for performing communication with a mobile device, etc. The level shift circuit 139 shifts the level of the communication pulse signal indicating the state information and received from the SIOI terminal 152, and outputs the resulting signal.

The SIOI terminal 152 and the SIOE terminal 153 are used to merely pass through the communication signal transmitted between the mobile device and the secondary battery monitoring IC 120. Specifically, if the voltage of one of these terminals is set to a low level, the low-level voltage signal is output to the other terminal. The same operation is performed for each of the bidirectional communication signals.

The secondary battery monitoring IC 120 is fabricated using a precision IC manufacture process of a microcomputer-incorporated semiconductor device (which is prone to static electricity), while the protection IC 130 is fabricated using an IC manufacturing process and has good resistance against static electricity and high voltage. The communication terminals used to communicate with a mobile device are also used as terminals of battery packs. It is necessary that the communication terminals meet the requirements of the safety standards of battery packs and have good resistance against static electricity and high voltage. However, if the communication terminals of the secondary battery monitoring IC 120 are used without changes, it is difficult for the communication terminals to meet the requirements for static electricity.

Therefore, in this embodiment, as described above, the protection IC 130 is arranged into the circuit which passes the communication signal transmitted between the SIOI terminal 152 connected to the SIO terminal (which is a communication terminal of the secondary battery monitoring IC 120) and the SIOE terminal 153 connected to the external terminal 116 (which is a communication output terminal with the mobile device body). Thereby, the SIO terminal of the secondary battery monitoring IC 120 receives the signal transmitted from the mobile device through the protection IC 130, and is provided to be a communication terminal that is strong against static electricity or high voltage.

In this embodiment, it is unnecessary to add static protection components, such as zener diodes, capacitors and resistors, in order to protect breakage of the communication terminal of the secondary battery monitoring IC 120, and the cost can be reduced and the substrate area can be reduced.

In this embodiment, the external terminal 116 shown in FIG. 1 is a communication terminal used by the secondary battery monitoring IC 120 to communicate with the mobile device, and the external terminal 116 is a terminal for outputting and inputting the information exchanged between the battery pack 100 and the mobile device.

As shown in FIG. 1, the resistor R4 is connected between the external terminal 116 and the SIOE terminal 153. An intermediate voltage between the positive terminal 114 and the negative terminal 115 is always applied to the external terminal 116. Even when a charger device is reversely connected to the external terminal 116, the supplied current is restricted by the resistor R4, and it is possible to prevent the protection IC 130 from being damaged.

Next, a case in which a charger device is reversely connected to the external terminal 116 which is used as a communication terminal with the mobile device will be described.

Figure 4:
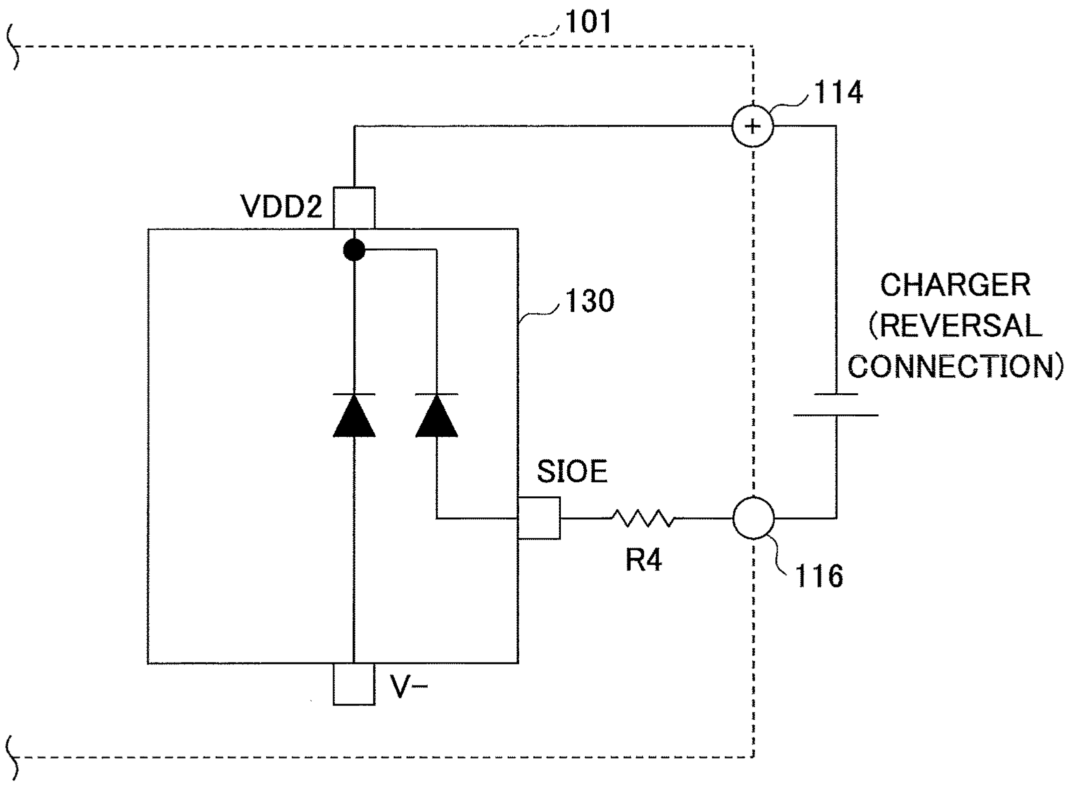
FIG. 4 is a diagram showing a condition in which a charger device is reversely connected to an external terminal.

FIG. 4 is a diagram showing a condition in which the charger device is reversely connected to the external terminal. As shown in FIG. 4, when the plus terminal side of the charger device is connected to the external terminal 116 and the negative electrode side of the charger device is connected to the positive terminal 114, the power supply direction of the protection IC 130 is reversed. In such a case, as shown in FIG. 4, the protection IC 130 is arranged to function as a forward-direction diode. Hence, the maximum amount of the current from the charger device connected will continuously flow through the protection IC 130, and there is a possibility that the protection monitoring circuit 101 will be heated by the supplied current.

However, in this embodiment, the resistor R4 having a resistance in a range between 1 kΩ and 10 kΩ is connected in series between the SIOE terminal 153 of the protection IC 130 and the external terminal 116, and the supplied current is restricted by the resistor R4 and reduced to an amount that does not cause heating of the protection monitoring circuit 101. Thereby, as described above, even in the case in which the charger device is reversely connected, the protection IC 130 can be protected from being damaged.

The effectiveness of the current restriction is so large that the resistance of the resistor R4 is high. However, the original communication function of the protection IC 130 may be affected if the resistance of the resistor R4 is too high. It is preferred that the resistance of the resistor is on the order of several kΩ, which depends on the communication specification. When the resistor R4 is added as a reverse charge protecting resistance in a case of the 1-line bidirectional communication specification, it is difficult to perform high speed communication exceeding the speed of 100 kHz, and the communication specification on the order of several 10 kHz (bps) may be used.

<Example of Communication from Secondary Battery Monitoring IC 120 to Protection IC 130>

Next, with reference to FIG. 5 and FIG. 6, an example of the communication from the secondary battery monitoring IC 120 to the protection IC 130 will be described.

Figure 5:
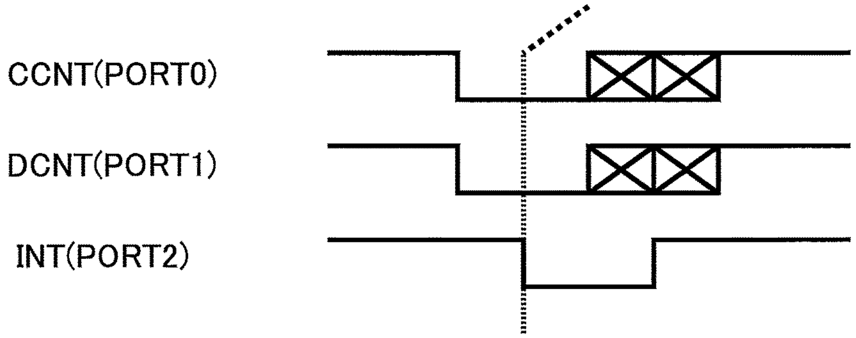
FIG. 5 is a diagram showing a signal output from the secondary battery monitoring IC to the protection IC of this embodiment.

FIG. 5 is a diagram for explaining the operation at the time of the communication from the secondary battery monitoring IC to the protection IC in this embodiment. FIG. 6 is a diagram showing a list of commands recognized by the protection IC.

A fundamental operation of the protection IC 130 is to recognize a command as shown in FIG. 6, at a time of a falling edge of the signal of the INT terminal as shown in FIG. 5, based on the output signal levels of the CCNT terminal and the DCNT terminal. At a time of a rising edge of the signal of the INT terminal, the output signal levels of the DCNT terminal and the CCNT terminal are disregarded.

In the example of FIG. 5, after the CCNT (PORT0) terminal is set to "0" and the DCNT (PORT1) terminal is set to "0", the pulling down of the INT (PORT2) terminal is performed. At the time of a falling edge of the signal of the INT terminal, the protection IC 130 latches the CCNT terminal and the DCNT terminal.

As in the command list of FIG. 6, the example of FIG. 5 is a case of DCNT=0 and CCNT=0, and the secondary battery monitoring IC 120 outputs a compulsive FET control cancellation command for compulsively canceling the control of the FET in the protection IC 130, to the protection IC 130.

According to FIG. 6, the secondary battery monitoring IC 120 outputs, in the case of DCNT=0 and CCNT=1, a command for compulsively shifting the DOUT terminal from a high level (H) to a low level (L) to the protection IC 130. In the case of DCNT=1 and CCNT=0, a command for compulsively shifting the COUT terminal from a high level (H) to a low level (L) is output to the protection IC 130.

In the case of DCNT=1 and CCNT=1, the secondary battery monitoring IC 120 outputs an inquiry command for asking the protection IC 130 of the protecting detection state (which is an operating state of the protection IC 130) to the protection IC 130.

When the compulsive control of the DOUT/COUT terminals is performed after the above-described command is received, the protection IC 130 performs overwrite control to the DOUT terminal and the COUT terminal (which control is internally considered an OR logic). When the received command is the inquiry of protecting detection state, the protection IC 130 sends a notification signal (command) indicating the protecting detection state thereof as shown in FIG. 7, to the secondary battery monitoring IC 120.

As described above, the secondary battery monitoring IC 120 performs the function for compulsively turning off the MOS transistors M11 and M12 which are the charge control FET and the discharge control FET in the protection IC 130, and performs the function for canceling the compulsive turning off of the MOS transistors in the protection IC 130. The secondary battery monitoring IC 120 performs the function for asking the protection IC 130 of the protecting detection state thereof.

<Example of Notification of Protecting Detection State of Protection IC 130 to Secondary Battery Monitoring IC 120 when Inquiry Command is Received from Secondary Battery Monitoring IC 120>

Next, with reference to FIG. 7, an example of notification of a protecting detection state of the protection IC 130 (operating state) from the protection IC 130 to the secondary battery monitoring IC when a protecting detection state inquiry command is received from the secondary battery monitoring IC 120 the protection IC 130 will be described. FIG. 7 is a diagram showing a notification command of a protecting detection state of the protection IC sent to the secondary battery monitoring IC.

In this embodiment, the protection IC 130 acquires the state of the logic circuit 136 when the protecting detection state inquiry command is received at the communication control circuit 138. After the state of the logic circuit 136 is received, the protection IC 130 sets up the CCNT terminal 149 and the DCNT terminal 150 according to the protecting detection state thereof. The terminal setting signal is predetermined to indicate the protecting detection state of the protection IC 130, such as overcharge detection, discharge overcurrent detection, charge overcurrent detection, as shown in FIG. 7.

For example, as shown in FIG. 7, in the case of DCNT=0 and CCNT=0, the protection IC 130 outputs a command indicating no error (normal condition) to the secondary battery monitoring IC 120. In the case of DCNT=0 and CCNT=1, the protection IC 130 outputs a command indicating the discharge overcurrent detection state to the secondary battery monitoring IC 120.

In the case of DCNT=1 and CCNT=0, the protection IC 130 outputs a command indicating the charge overcurrent detection state to the secondary battery monitoring IC 120. In the case of DCNT=1 and CCNT=1, the protection IC 130 outputs a command indicating the overcharge detection state to the secondary battery monitoring IC 120.

As described above, the protection IC 130 performs the function for notifying the protecting detection state of the protection IC 130 in response to the protecting detection state inquiry from the secondary battery monitoring IC 120.

<Example of Communication from Protection IC 130 to Secondary Battery Monitoring IC 120>

Next, with reference to FIGS. 8, 9 and 10, some examples of operation at the time of the communication from the protection IC 130 to the secondary battery monitoring IC 120 will be described.

Figure 8:
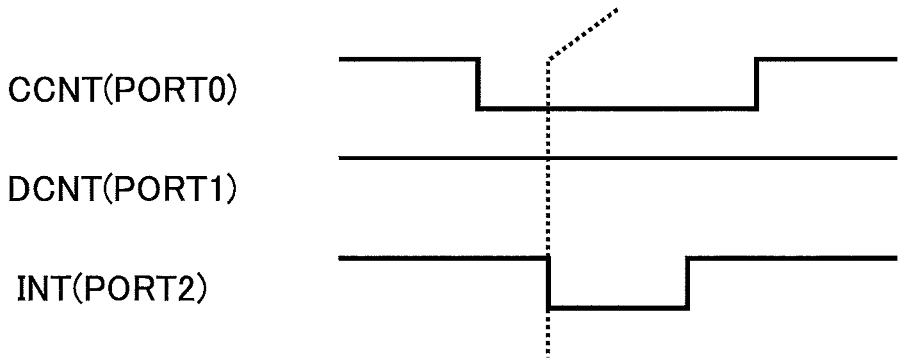
FIG. 8 is a diagram for explaining the operation at a time of the communication from the protection IC to the secondary battery monitoring IC when a state of the secondary battery other than overdischarge is detected by the protection IC.

FIG. 8 is a diagram for explaining the operation at the time of the communication from the protection IC to the secondary battery monitoring IC when an undesired state of the secondary battery other than overdischarge is detected. In the case of FIG. 8, the logic of CCNT (PORT0) and DCNT (PORT1) denotes the state of these terminals when a charge overcurrent state of the secondary battery is detected. FIG. 9 is a diagram for explaining the operation at the time of the communication from the protection IC to the secondary battery monitoring IC when an overdischarge state of the secondary battery is detected. FIG. 10 shows a list of the commands recognized in the secondary battery monitoring IC.

The operation performed by the protection IC 130 in the case of detection of the battery overdischarge is different from that in the cases of detection of the battery overcharge and overcurrent other than the battery overdischarge. Specifically, in the cases of detection of the battery overcharge, discharge overcurrent and charge overcurrent, other than the battery overdischarge, the protection IC 130 sets the CCNT terminal and the DCNT terminal according to the command list of FIG. 10 and outputs a pulse signal to the INT terminal.

As shown in FIG. 8, when overcharge of the secondary battery is detected, the protection IC 130 sets the CCNT (PORT0) terminal to a low level (0), sets the DCNT (PORT1) terminal to a high level (1), and thereafter outputs a pulse signal with a low level to the INT (PORT1) terminal for a fixed time. Subsequently, the protection IC 130 sets the CCNT (PORT0) terminal in an open state (high level).

The secondary battery monitoring IC 120 receives a falling edge of the pulse signal from the INT terminal as a trigger, and latches the CCNT terminal and the DCNT terminal. For example, the pulse width of the signal from the INT terminal is set to MIN=100 microseconds, in order to ensure the latching at 38.4 kHz.

Figure 9:
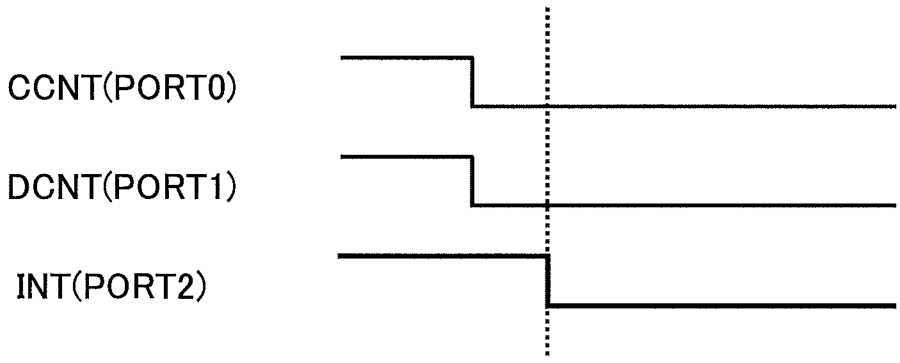
FIG. 9 is a diagram for explaining the operation at a time of the communication from the protection IC to the secondary battery monitoring IC when overdischarge of the secondary battery is detected by the protection IC.

As shown in FIG. 9, when overdischarge of the secondary battery is detected, the protection IC 130 sets the CCNT (PORT0) terminal to a low level, sets the DCNT (PORT1) terminal to a low level, and pulls down the INT (PORT1) terminal (or sets the INT (PORT1) terminal to a low level and holds the same).

Figures 10, 11:
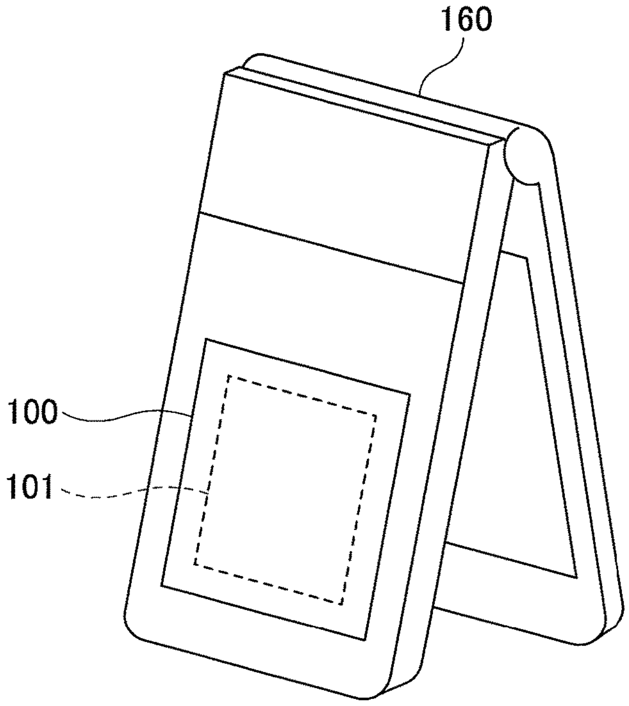
FIG. 10 is a diagram showing a list of commands recognized by the secondary battery monitoring IC.
FIG. 11 is a diagram showing an example of a mobile device in which a battery pack including a protection monitoring circuit of this embodiment is arranged.

As shown in FIG. 10, in the case of DCNT=0 and CCNT=0, the protection IC 130 notifies a command of overdischarge detection to the secondary battery monitoring IC 120. In the case of DCNT=0 and CCNT 1, the protection IC 130 notifies a command of discharge overcurrent detection to the secondary battery monitoring IC 120. In the case of DCNT=1 and CCNT=0, the protection IC 130 notifies a command of charge overcurrent detection to the secondary battery monitoring IC 120. In the case of DCNT=1 and CCNT=1, the protection IC 130 notifies a command of overcharge detection to the secondary battery monitoring IC 120.

After overdischarge of the secondary battery is detected and the DOUT terminal is set to the low level, the protection IC 130 maintains the INT (PORT2) terminal at the low level, turns off the voltage regulator 131 that supplies the voltage to the secondary battery monitoring IC 120, and thereafter sets the INT (PORT2) terminal in a HiZ (high-impedance) state. Because the voltage regulator 131 is turned off, the output signal is apparently kept at the low level.

As described above, the protection IC 130 is arranged to perform an interrupt process to notify the secondary battery monitoring IC 120 of the information indicating that one of overcharge, overdischarge, charge overcurrent, discharge overcurrent, etc. of the secondary battery is detected.

The secondary battery monitoring IC 120 and the protection IC 130 use the two-way communication interface of three lines to perform the above-described function. One of the three lines is an interrupt signal line which is used to send an interrupt signal to the other device when the devices are in a communication state. The remaining lines are used to send the information of the contents of the communication.

The secondary battery monitoring IC 120 and the protection IC 130 use the two-way communication interface of three lines to perform the above-described function. Alternatively, when extending further the above-described function, the number of lines may be increased if needed, and the two-way communication interface of 4 or more lines may be used.

<Example of Battery Pack Including Protection Monitoring Circuit, and Mobile Device Including Battery Pack>

Next, with reference to FIG. 11, a battery pack 100 including a protection monitoring circuit 101 of an embodiment of the present disclosure as well as a mobile device 160 in which the battery pack 100 is arranged will be described. FIG. 11 shows an example of a battery pack including the protection monitoring circuit of this embodiment and a mobile device in which the battery pack is arranged.

As shown in FIG. 11, the protection monitoring circuit 101 of this embodiment is contained in the battery pack 100. The battery pack 100 including the protection monitoring circuit 101 is installed in the mobile device 160.

As described above, according to the present disclosure, the secondary battery monitoring circuit can compulsively operate the protection circuit, thereby providing a duplicate protection function for increased safety when overcharge, overcurrent, overdischarge, etc. of the battery pack is detected. For example, the voltage monitoring by the secondary battery monitoring circuit can provide good accuracy of the detection voltage.

Moreover, according to the present disclosure, the secondary battery monitoring circuit can request, at arbitrary timing, receiving of an operating state of the protection circuit from the protection circuit. Hence, the secondary battery monitoring circuit can detect whether the protecting operation is continuously performed by the protection circuit.

According to the present disclosure, when the protection circuit has operated, the secondary battery monitoring circuit is caused to perform an interrupt process for outputting information indicating that the protection circuit has operated, so that the log information of the protecting operation can be stored in the secondary battery monitoring circuit.

As described above, the secondary battery monitoring circuit can certainly store the log information of the protecting operation by the protection circuit for protecting the secondary battery. Based on the log information of the protecting operation read from the battery pack, the use of the battery pack may be stopped, the charging of the battery pack may be inhibited, or exchange of the battery pack with a new battery pack may be requested to the user of the mobile device.

Therefore, even if a problem of the battery pack, such as bulging or heating, occurs, reading the log information of the protecting operation from the battery pack at a local sales office makes it possible to determine whether the problem of the battery pack is caused by a normal operation or an erroneous operation of the user. In other words, the log information may be used as effective information for testing of the battery pack under fault conditions.

The present disclosure is not limited to the above-described embodiments, and variations and modifications may be made without departing from the scope of the present disclosure.

INDUSTRIAL APPLICABILITY

The present disclosure is applicable to a protection monitoring circuit, a battery pack, a secondary battery monitoring circuit, and a protection circuit.

What is claimed is:

1. A protection monitoring circuit comprising:

a protection circuit which detects at least one of overcharge, overdischarge, and overcurrent of a secondary battery, and a secondary battery monitoring circuit which monitors a state of the secondary battery and detects a residual quantity of the secondary battery;

wherein the protection circuit includes:

a first communication terminal that is connected to the secondary battery monitoring circuit, a second communication terminal that is connected to a mobile device, and a level shift circuit that is connected to the first and second communication terminals, wherein the level shift circuit is configured to:

perform a level shift of a signal input of the first communication terminal so as to become a second level and output the signal to the second communication terminal, and perform the level shift of a signal input of the second communication terminal so as to become a first level and output the signal to the first communication terminal.

2. The protection monitoring circuit according to claim 1, wherein the protection circuit includes an integrated circuit that is formed so as to have a high pressure resistance, and wherein the secondary battery monitoring circuit includes an integrated circuit that is formed so as to have a pressure resistance less than that of the protection circuit.

3. The protection monitoring circuit according to claim 1, wherein the first level is a power supply voltage level of the secondary battery monitoring circuit, and wherein the second level is a power supply voltage level of the mobile device.

4. The protection monitoring circuit according to claim 1, wherein the secondary battery monitoring circuit sends information data to and receives the information data from mobile device through the first communication terminal, the level shift circuit and the second communication terminal.

5. The protection monitoring circuit according to claim 1, wherein the level shift circuit is configured to perform a bilateral level shifting between the first and second communication terminals.

* * * * *